United States Patent [19]
Yoshinari et al.

[11] Patent Number: 6,120,921
[45] Date of Patent: Sep. 19, 2000

[54] MAGNETO-OPTICAL RECORDING MEDIUM

[75] Inventors: Jiro Yoshinari; Shinji Miyazaki; Hiroyasu Inoue, all of Nagano, Japan

[73] Assignee: TDK Corporation, Tokyo, Japan

[21] Appl. No.: 09/055,874

[22] Filed: Apr. 7, 1998

[30] Foreign Application Priority Data

Apr. 10, 1997 [JP] Japan .................................. 9-108089

[51] Int. Cl.$^7$ ........................................................ G11B 5/66
[52] U.S. Cl. .......................... 428/694 ML; 428/694 SC; 428/694 NT; 428/694 RE; 428/694 MM; 428/694 EC; 428/900; 369/13
[58] Field of Search ..................... 422/694 ML, 694 SC, 422/694 NT, 694 RE, 694 MM, 694 EC, 900; 369/13

[56] References Cited

FOREIGN PATENT DOCUMENTS

8-007350   1/1996   Japan .

*Primary Examiner*—Leszek Kiliman
*Attorney, Agent, or Firm*—Laubscher & Laubscher; R. J. Lasker

[57] ABSTRACT

The magneto-optical recording medium of the present invention has a triple-layer magnetic laminate on the surface side of the substrate, and the magnetic laminate comprises an amplification layer $A_1$, an exchange coupling control layer $C_{12}$ and a recording layer $R_2$ formed in this order. In the recording of the medium, magnetic domain is formed in the recording layer $R_2$ and, and in the reproduction of the medium, the magnetic domain in $R_2$ is copied to $A_1$ to form a copied magnetic domain simultaneously with the enlarging of the thus formed copied magnetic domain in $A_1$ by irradiation of a laser beam and application of a reproduction magnetic field. In the present invention, the amplification layer $A_1$ does not have a compensation temperature higher than room temperature. Curie temperature $Tc_{A1}$ of the amplification layer $A_1$, Curie temperature $Tc_{C12}$ of the exchange coupling control layer $C_{12}$, and Curie temperature $Tc_{S12}$ of the switching layer $S_{12}$ are either $Tc_{A1} < Tc_{C12}$; or $Tc_{S12}$ is higher than room temperature and $Tc_{S12} < Tc_{A1}$. Intensity of the reproduced signals are thereby sufficiently increased.

18 Claims, 2 Drawing Sheets

FIG. 1A
AS-RECORDED STATE

FIG. 1B
INITIALIZATION

INITIALIZATION MAGNETIC FIELD $H_I$

FIG. 1C
COPYING

LASER BEAM

REPRODUCTION MAGNETIC FIELD $H_R$

FIG. 1D
ENLARGEMENT

LASER BEAM

REPRODUCTION MAGNETIC FIELD $H_R$

FIG. 1E
SHRINKAGE

LASER BEAM

ERASE MAGNETIC FIELD $H_E$

FIG. 1F
DISAPPEARANCE

LASER BEAM

ERASE MAGNETIC FIELD $H_E$

FIG. 2A
AS-RECORDED STATE

FIG. 2B
INITIALIZATION
INITIALIZATION MAGNETIC FIELD $H_I$

FIG. 2C
COPYING
LASER BEAM

REPRODUCTION MAGNETIC FIELD $H_R$

FIG. 2D
ENLARGEMENT
LASER BEAM

REPRODUCTION MAGNETIC FIELD $H_R$

FIG. 2E
SHRINKAGE
LASER BEAM

ERASE MAGNETIC FIELD $H_E$

FIG. 2F
DISAPPEARANCE
LASER BEAM

ERASE MAGNETIC FIELD $H_E$

MAGNETO-OPTICAL RECORDING MEDIUM

BACKGROUND OF THE INVENTION

1. Technical Field

This invention relates to a magneto-optical recording medium wherein the signals reproduced are amplified in the reproduction through enlargement of the recorded magnetic domains.

2. Background Art

A magneto-optical recording medium is a recording medium wherein temperature of the magnetic thin film is locally elevated by means of a laser beam or the like to reduce coercive force, and wherein the direction of magnetization in this part is reversed with external magnetic field, or alternatively, the magnetization direction of initialization is maintained to thereby form a magnetic domain (record mark), and wherein the magnetization direction of the magnetic domain is read out by utilizing Kerr effect or Faraday effect.

In conventional magneto-optical recording media, density of the reproducible magnetic domains has been limited by the diameter of the laser beam spot used for the reproduction, and the magnetic domains of a diameter less than half of the laser beam spot diameter has been hardly reproducible.

Japanese Patent Application Kokai No. (JP-A) 8-7350 discloses an exemplary magneto-optical recording medium wherein production of the magnetic domain with a diameter less than half of the laser beam spot diameter has been enabled. This magneto-optical recording medium has a recording film comprising three magnetic layers, namely, first, second and third magnetic layers disposed on the substrate in this order, and the three magnetic layers are exchange-coupled. In the reproduction, the medium is irradiated with a laser beam from the side of the substrate, and reproduction magnetic field is applied from the side of the recording film. The recorded magnetic domain is retained in the third magnetic layer, and the magnetic domain is copied to the first and the second magnetic layers by laser beam irradiation. The thus copied magnetic domains enlarge in in-plane directions of the magnetic layers upon application of the read magnetic field. The copied, enlarged magnetic domain is read out as in the case of conventional magneto-optical recording media. When the reproduction of the copied, enlarged magnetic domain is completed, the copied magnetic domain is erased by applying erasing magnetic field whose direction is opposite to the reading magnetic field. By repeating such procedure, small magnetic domains which had been unreproducible in conventional method could be reproduced. The merit of this process is not only the high reproduction resolution. Since the magnetic domains are actually enlarged, fundamental enhancement in the intensity of the reproduced signals is enabled.

In the aforesaid JP-A 8-7350, the second magnetic layer comprises a rare earth and metal-transition metal alloy which has a compensation temperature higher than room temperature, and the second magnetic layer has a Curie temperature which is lower than the recording temperature of the minute magnetic domain. The third magnetic layer also comprises a rare earth and metal-transition metal alloy, and at room temperature, the magnetic moment as a whole is in the same direction as the magnetic moment of the rare earth metal.

The inventors of the present invention, however, have found that the intensity of the signals reproduced is only insufficiently improved by the recording medium having the recording film constitution as described in the aforesaid JP-A 8-7350 since the exchange coupling force between the magnetic layers is too strong. In addition, the aforesaid JP-A 8-7350 requires fabrication of the second magnetic layer from a rare earth metal-transition metal alloy having a compensation temperature higher than room temperature. The compensation temperature, however, greatly fluctuates by slight difference in the composition, and it is extremely difficult to adjust the compensation temperature to a particular temperature range above the room temperature.

SUMMARY OF THE INVENTION

An object of the present invention is to sufficiently improve the intensity of the reproduced signals in a magneto-optical recording medium of the constitution wherein the recording layer is of multi-layer structure and the recorded magnetic domain is copied and enlarged for the reproduction.

The object as described above is accomplished by any one of (1) to (9) as described below.

(1) A magneto-optical recording medium having a magnetic laminate on the surface side of the substrate, said magnetic laminate comprising a triple-layer magnetic laminate comprising an amplification layer $A_1$, an exchange coupling control layer $C_{12}$ and a recording layer $R_2$ formed in this order, wherein upon recording, magnetic domain is formed in the recording layer $R_2$ by irradiation of a laser beam and application of a recording magnetic field; and upon reproduction, the magnetic domain in the recording layer $R_2$ is copied to the amplification layer $A_1$ to form a copied magnetic domain simultaneously with the enlarging of the thus formed copied magnetic domain in the amplification layer $A_1$ by irradiation of a laser beam and application of a reproduction magnetic field; and the amplification layer $A_1$ does not have a compensation temperature which is higher than room temperature; and Curie temperature $Tc_{A1}$ of the amplification layer $A_1$ and Curie temperature $Tc_{C12}$ of the exchange coupling control layer $C_{12}$ are in the relation:

$$Tc_{A1} < Tc_{C12}$$

(2) A magneto-optical recording medium according to the above (1) wherein Curie temperature $Tc_{A1}$ of the amplification layer $A_1$ and Curie temperature $Tc_{R2}$ of the recording layer $R_2$ are in the relation:

$$Tc_{A1} < Tc_{R2}$$

(3) A magneto-optical recording medium according to the above (1) wherein the magnetic laminate further comprises an enhancing layer $E_{01}$ formed between the amplification layer $A_1$ and the substrate, said enhancing layer $E_{01}$ being a magnetic layer for the purpose of enhancing Kerr effect; and Curie temperature $Tc_{E01}$ of the enhancing layer $E_{01}$ and Curie temperature of $Tc_{A1}$ of the amplification layer $A_1$ are in the relation:

$$Tc_{A1} < Tc_{E01}$$

(4) A magneto-optical recording medium having a magnetic laminate on the surface side of the substrate, said magnetic laminate having at least triple layers, comprising an amplification layer $A_1$, a switching layer $S_{12}$ and a recording layer $R_2$ formed in this order, wherein upon recording, magnetic domain is formed in the recording layer $R_2$ by irradiation of a laser beam and application of a recording magnetic field; and upon reproduction, the magnetic domain in the recording layer $R_2$ is copied to the amplification layer $A_1$ to form a copied magnetic domain simultaneously with the enlarging of the thus formed copied magnetic domain in the amplification layer $A_1$ by irradiation of a laser beam and application of a reproduction magnetic field; and the amplification layer $A_1$ does not have a compensation temperature which is higher than room temperature; and Curie temperature $Tc_{S12}$ of the switching layer $S_{12}$ and Curie temperature $Tc_{A1}$ of the amplification layer $A_1$ are such that $Tc_{S12}$ is higher than room temperature and $Tc_{S12}$ and $Tc_{A1}$ are in the relation:

$$Tc_{S12} < Tc_{A1}$$

(5) A magneto-optical recording medium according to the above (4) wherein Curie temperature $Tc_{A1}$ of the amplification layer $A_1$ and Curie temperature $Tc_{R2}$ of the recording layer $R_2$ are in the relation such that:

$$Tc_{A1} < Tc_{R2}$$

(6) A magneto-optical recording medium according to the above (4) wherein the magnetic laminate further comprises an enhancing layer $E_{01}$ formed between the amplification layer $A_1$ and the substrate, said enhancing layer $E_{01}$ being a magnetic layer for the purpose of enhancing Kerr effect; and Curie temperature $Tc_{E01}$ of the enhancing layer $E_{01}$ and Curie temperature of $Tc_{A1}$ of the amplification layer $A_1$ are in the relation:

$$Tc_{A1} < Tc_{E01}$$

(7) A magneto-optical recording medium having a magnetic laminate on the surface side of the substrate, said magnetic laminate having at least double layers comprising an amplification layer $A_1$ and a recording layer $R_2$ formed in this order, wherein upon recording, magnetic domain is formed in the recording layer $R_2$ by irradiation of a laser beam and application of a recording magnetic field; and upon reproduction, the magnetic domain in the recording layer $R_2$ is copied to the amplification layer $A_1$ to form a copied magnetic domain simultaneously with the enlarging of the thus formed copied magnetic domain in the amplification layer $A_1$ by irradiation of a laser beam and application of a reproduction magnetic field; and the amplification layer $A_1$ does not have a compensation temperature which is higher than room temperature.

(8) A magneto-optical recording medium according to the above (7) wherein Curie temperature $Tc_{A1}$ of the amplification layer $A_1$ and Curie temperature $Tc_{R2}$ of the recording layer $R_2$ are in the relation:

$$Tc_{A1} < Tc_{R2}$$

(9) A magneto-optical recording medium according to the above (7) wherein the magnetic laminate further comprises an enhancing layer $E_{01}$ formed between the amplification layer $A_1$ and the substrate, said enhancing layer $E_{01}$ being a magnetic layer for the purpose of enhancing Kerr effect; and Curie temperature $Tc_{E01}$ of the enhancing layer $E_{01}$ and Curie temperature of $Tc_{A1}$ of the amplification layer $A_1$ are in the relation:

$$Tc_{A1} < Tc_{E01}$$

OPERATION

In the present invention, an exchange coupling control layer or a switching layer of particular properties is disposed in a magneto-optical recording medium of the constitution wherein the recording medium is of multi-layer structure and the recorded magnetic domain is copied and enlarged for the reproduction. Provision of such layer facilitates the enlargement of the copied magnetic domain, and the intensity of the reproduced signals will be sufficiently increased. In contrast to the conventional magneto-optical recording media wherein the recorded magnetic domain is copied and enlarged for the reproduction, the medium of the present invention does not require deposition of the magnetic layer having a compensation temperature higher than room temperature. Therefore, design of the composition and formation of the magnetic layer may be readily accomplished.

In the present invention, if the exchange coupling control layer or the switching layer were not provided, and a magnetic layer having a compensasion temperature higher than room temperature were not provided, the reproduction of the recorded magnetic domain through copying and enlargement is accomplished although the output of the reproduction signal is somewhat low.

DESCRIPTION OF THE PREFERRED EMBODIMENTS

The invention described in this patent application comprises constitutions I, II, or III as described below. The constitutions I, II, and III are hereinafter described by referring to their embodiments.

Constitution I

The magneto-optical recording medium of Constitution I has a magnetic laminate on the surface side of the medium, and this magnetic laminate comprises at least three layers, namely, an amplification layer $A_1$, an exchange coupling control layer $C_{12}$, and a recording layer $R_2$ in this order. The recording layer $R_2$ is the layer where magnetic domains are formed by the magneto-optical recording. In the reproduction of the magneto-optical recording medium wherein recorded magnetic domain has been formed, an initialization magnetic field in the direction perpendicular to the magnetic laminate is first applied. Next, the medium is irradiated with a laser beam to sequentially copy the magnetic domains formed in the recording layer $R_2$ to the amplification layer $A_1$ through the exchange coupling control layer $C_{12}$ to form copied magnetic domains. Simultaneously with the copying of the recorded magnetic domain, a reproduction magnetic field is applied to the medium to enlarge the copied magnetic domain. The direction of the reproduction magnetic field is opposite to the initialization magnetic field. The thus enlarged copied magnetic domain in the amplification layer $A_1$ is read out. Next, the copied magnetic domain in the amplification layer $A_1$ whose reproduction has been completed is allowed to shrink and disappear by applying an erasing magnetic field whose magnetization direction is opposite to the reproduction magnetic field. The magnetic domain adjacent to the magnetic domain whose reproduction has been just completed is subsequently reproduced. In other words, in the reproduction procedure as described above, copying of the magnetic domain, enlargement of the copied magnetic domain, reproduction of the enlarged magnetic domain and disappearance of the magnetic domain continuously takes place one after another by the irradiation of the laser beam and the simultaneous application of the modulated magnetic field.

Reproduction Step (Constitution I)

The case of the magnetic domain whose magnetizing direction is the same as the reproduction magnetic field FIGS. 1A, 1B, 1C, 1D, 1E and 1F are schematic views showing the magnetizing direction of the magnetic layers of the magnetic laminate. The blank arrows indicate the direction of the magnetization direction of the magnetic layer as a whole, and the black arrows indicate the spin direction of the transition metal element in the magnetic layer. Such figure legends are common to other drawings. The amplification layer $A_1$ of the present invention has either no compensation temperature or a compensation temperature which is lower than room temperature, and therefore, the magnetization direction is consistent with the spin direction. It should be noted that the recording layer $R_2$ may have a compensation temperature which is higher than the room temperature.

First, of the magnetic domains recorded in the recording layer $R_2$, reproduction of the magnetic domain having the magnetization direction which is the same as the magnetization direction of the reproduction magnetic field, that is, reproduction of the magnetic domain having the magnetization direction in the upward direction in FIGS. 1A, 1B, 1C, 1D, 1E and 1F is explained.

Figure 1:
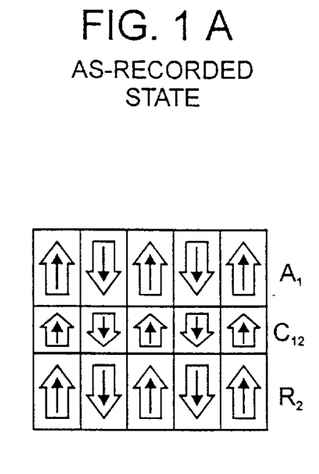
FIGS. 1A, 1B, 1C, 1D, 1E and 1F schematically illustrate the reproduction process according to the present invention.

FIG. 1A: As-recorded state

As shown in FIG. 1A, magnetic domains are formed in the recording layer $R_2$ by the magneto-optical recording. The domains which has the same spin direction as the recording layer $R_2$ are formed in the amplification layer $A_1$ by the interface wall exchange coupling force. It should be noted that the composition and the thickness of the exchange coupling control layer $C_{12}$ are adjusted so that the layer $C_{12}$ may function as a domain wall.

FIG. 1B: Initialization

To the magneto-optical recording medium of the conditions as described above, was applied the initialization magnetic field $H_I$ as shown in FIG. 1B. The initialization magnetic field is applied by an initialization magnetic head. The initialization magnetic head is arranged at a position distant from the reproducing magnetic head as described below. By the application of the initialization magnetic field $H_I$, the magnetization direction of the amplification layer $A_1$ and the exchange coupling control layer will be the same as the initialization magnetic field.

FIG. 1C: Copying of the magnetic domain

After the application of the initialization magnetic field, the medium is irradiated with a laser beam simultaneously with the application of the reproduction magnetic field $H_R$. The reproduction magnetic head used for applying the reproduction magnetic field $H_R$ and the optical pick up used for irradiating the laser beam are generally arranged on opposite sides of the medium, and the laser beam is irradiated from the side of the substrate. The reproducing magnetic field $H_R$ is of the direction opposite to the initialization magnetic field $H_I$.

Temperature of the magnetic layers is elevated by the irradiation of the laser beam, and the interface wall exchange coupling force between the adjacent magnetic layers is increased. The recorded magnetic domain of the recording layer $R_2$ is thereby copied to the amplification layer $A_1$ to form a copied magnetic domain. The magnetization direction of the copied magnetic domain formed in the amplification layer $A_1$ is opposite to the direction of the initialization magnetization direction.

FIG. 1D: Enlargement of copied magnetic domain

Since the reproducing magnetic field $H_R$ of the direction which is the same as the magnetization direction of the magnetic layer is applied to each of the magnetic layers, the magnetic domains of the magnetic layers attempt to enlarge in the in-plane direction. In this occasion, the enlargement of the magnetic domain in the recording layer $R_2$ is avoided while the enlargement of the magnetic domain in the amplification layer $A_1$ is promoted. For this purpose, the recording layer $R_2$ is adjusted, for example, such that the coercive force of high level is retained at the temperature of the laser beam irradiation to thereby avoid the enlargement of the magnetic domain. On the other hand, the amplification layer $A_1$ is adjusted, for example, such that the interface wall exchange coupling force between the amplification layer $A_1$ and the recording layer $R_2$ is weak enough to overcome the effective magnetic field caused by Bloch wall and the coercive force to enable the enlargement of the magnetic domain.

After such enlargement of the copied domain in the amplification layer $A_1$, the enlarged copied domain is read out by utilizing magnetic Kerr effect.

FIGS. 1E and 1F: Shrinkage and disappearance of copied magnetic domain

After reading out the copied magnetic domain in the amplification layer $A_1$ by utilizing magnetic Kerr effect, an erasing magnetic field $H_E$ whose magnetization direction is opposite to the reproduction magnetic field is applied. By applying the erase magnetic field $H_E$ whose magnetization direction is opposite to the copied magnetic domain, the copied magnetic domain shrinks as shown in FIG. 1E and disappears as shown in FIG. 1F, and the magnetization direction of the region which had been the copied magnetic domain then restores its original magnetization direction the same as the surrounding region, namely, the magnetization direction of the initialization magnetic field $H_I$. As a consequence, the magnetization state of the magnetic layers returns to the state as shown the FIG. 1B.

The case of the magnetic domain whose magnetizing direction is opposite to the reproduction magnetic field Next, of the magnetic domains recorded in the recording layer $R_2$, reproduction of the magnetic domain having the magnetization direction opposite to the magnetization direction of the reproduction magnetic field, that is, reproduction of the magnetic domain having the magnetization direction in the downward direction in FIGS. 1A, 1B, 1C, 1D, 1E and 1F is explained.

In this case, the magnetic domain of the recording layer $R_2$ is also copied to the amplification layer $A_1$. The magnetization direction of the copied magnetic domain formed, however, is the same as the initialization magnetic field, and the magnetization state of the amplification layer $A_1$ is not changed, and the same magnetization state is maintained throughout the process of the reproduction. In this state, the magnetization direction of the amplification layer $A_1$ is read out by the magnetic Kerr effect. In the reproduction process of this magnetic domain, it is necessary that the magnetization direction of the copied domain is not reversed throughout the process.

Reproduction Condition (Constitution I)

In order to accomplish the reproduction in the process as described above, it is necessary that the magnetic domain is copied to the amplification layer $A_1$ while the recording layer $R_2$ remains unaffected at the temperature of the magnetic laminate when it is irradiated with the laser beam in the reproduction. For this, the Curie temperature of the amplification layer $A_1$ ($Tc_{A1}$) is preferably lower than the Curie temperature of the recording layer $R_2$ ($Tc_{R2}$), and $Tc_{A1}$ should be higher than the room temperature. This is common to the Constitutions II and III as described below.

In constitution I, the Curie temperature of the amplification layer $A_1$ ($Tc_{A1}$) and the Curie temperature of the exchange coupling control layer $C_{12}$ ($Tc_{C12}$) is such that:

$$Tc_{A1} < Tc_{C12}$$

By providing the exchange coupling control layer $C_{12}$ of such properties, enlargement of the copied magnetic domain in the amplification layer $A_1$ is markedly facilitated.

Copying Condition I

In order to enable sufficient copying of the magnetic domain from the recording layer $R_2$ to the amplification layer $A_1$, the magnetic laminate should satisfy the relation:

$$Hw_{A1R2} + Hr > Hc_{A1} - Hd_{A1} \qquad (I\text{-}1)$$

when the amplification layer $A_1$ has a coercive force $Hc_{A1}$ and a demagnetizing field $Hd_{A1}$, and $Hw_{A1R2}$ is the effective magnetic field caused by the interface wall between the amplification layer $A_1$ and the recording layer $R_2$ on said amplification layer $A_1$ and the copying is accomplished by the reproduction magnetic field at an intensity of Hr.

The reproduction magnetic field generally fluctuates in a sinusoidal curve with lapse of time, and the value Hr is not necessarily the same value in the various phases described in the present invention.

The effective magnetic field caused by interface wall, on $A_1$ for example, in the case of $Hw_{A1R2}$ is:

$$Hw_{A1R2} = \sigma w_{A1R2} / 2Ms_{A1} t_{A1}$$

wherein $\sigma W_{A1R2}$ (also referred to as $\sigma W_{R2A1}$) is the interface wall energy between the amplification layer $A_1$ and the adjacent recording layer $R_2$; $Ms_{A1}$ is the saturation magnetization of the amplification layer $A_1$; and $ts_{A1}$ is the thickness of the amplification layer $A_1$. The exchange coupling control layer $C_{12}$ functions as the magnetic domain wall and controls the $\sigma W_{A1R2}$.

The condition represented by the relation (I-1) should be satisfied whether the magnetizing direction of the magnetic domain is the same as the reproducing magnetic field or opposite to the reproducing magnetic field.

Non-Reversal Condition I

When the magnetization direction of the copied magnetic domain in the amplification layer $A_1$ is opposite to the reproducing magnetic field, it is necessary that the magnetization direction of the copied magnetic domain is not reversed by the application of the reproducing magnetic field. When the reproducing magnetic field has an intensity of Hr, such condition (non-reversal condition) may be represented by the relation:

$$Hr < Hw_{A1R2} + Hc_{A1} - Hd_{A1} \qquad (I\text{-}2)$$

Enlargement Condition I

When the magnetization direction of the copied magnetic domain in the amplification layer $A_1$ is the same as the direction of the reproducing magnetic field, the copied magnetic domain should be enlarged by applying the reproducing magnetic field. When the effective magnetic field caused by the Bloch wall on the amplification $A_1$ is $Hw_{A1}$, the condition (enlargement condition) for enabling the enlargement of the copied magnetic domain in the amplification layer $A_1$ may be represented by the relation:

$$Hr > Hw_{A1R2} - Hd_{A1} + Hw_{A1} \qquad (I\text{-}3)$$

Disappearance Condition I

The copied magnetic domain in the amplification layer $A_1$ should disappear before the reproduction of the adjacent magnetic domain in the in-plane direction. When the magnetization direction of the copied magnetic domain in the amplification layer $A_1$ is the same as the direction of the reproducing magnetic field, the condition (disappearance condition) for enabling the disappearance of the copied magnetic domain in the presence of the erasing magnetic field $H_E$ may be represented by the relation:

$$He > Hw_{A1R2} - Hd_{A1} + Hw_{A1} \qquad (I\text{-}4)$$

Non-copying Condition I

The condition (non-copying condition) required to prevent the re-copying of the magnetic domain of the recording layer $R_2$ to the amplification layer $A_1$ after the disappearance of the copied magnetic domain in the amplification layer $A_1$ may be represented by the relation:

$$Hw_{A1R2} < Hc_{A1} - Hd_{A1} + He \qquad (I\text{-}5)$$

Condition of Amplification Layer $A_1$

In order to realize the enlargement condition and the non-reversal condition as described above at the same temperature in the amplification layer $A_1$, it is necessary to simultaneously satisfy the following relations:

$$Hr < Hw_{A1R2} + Hc_{A1} - Hd_{A1}, \text{ and} \qquad (I\text{-}2)$$

$$Hr > Hw_{A1R2} - Hd_{A1} + Hw_{A1}. \qquad (I\text{-}3)$$

In other words, the relation:

$$Hc_{A1} > Hw_{A1} \qquad (I\text{-}6)$$

should be met at the temperature at which the enlargement of the copied magnetic domain occur in the amplification layer $A_1$.

Constitution II

The magneto-optical recording medium of constitution II has a constitution similar to the constitution I except that a switching layer $S_{12}$ is provided instead of the exchange coupling force-controlling layer $C_{12}$. The switching layer $S_{12}$ is a magnetic layer which has a Curie temperature $Tc_{S12}$ higher than the room temperature and lower than the Curie temperature $Tc_{A1}$ of the amplification layer $A_1$.

Next, the reproduction process and the conditions required for the reproduction in the constitution II are described.

Reproduction Step (Constitution II)

The case of the magnetic domain whose magnetizing direction is the same as the direction of the reproduction magnetic field First, in the magnetic domains recorded in the recording layer $R_2$, reproduction of the magnetic domain having the magnetization direction which is the same as the magnetization direction of the reproduction magnetic field, that is, reproduction of the magnetic domain having the magnetization direction shown by blank arrow in the upward direction in FIGS. 2A, 2B, 2C, 2D, 2E and 2F is explained.

Figure 2A:
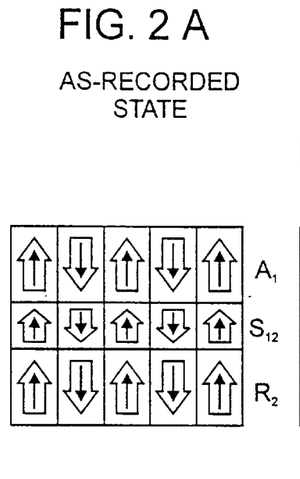
FIGS. 2A, 2B, 2C, 2D, 2E and 2F schematically illustrate the reproduction process according to the present invention.

FIG. 2A: As-recorded state

The as-recorded state of the magnetic laminate is similar to the one shown in FIG. 1A except that magnetic domains having the magnetization direction the same as the recording layer $R_2$ is formed in the switching layer $S_{12}$ by the interface wall exchange coupling force.

Figure 2B:
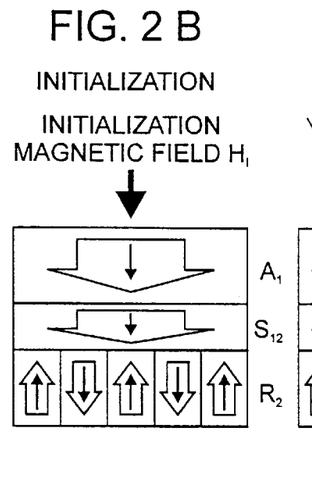

FIG. 2B: Initialization

The state of the magnetic laminate is similar to the one shown in FIG. 1B except that the switching layer $S_{12}$ is magnetized by the initialization magnetic field $H_I$ in the direction the same as the direction of the initialization magnetic field.

Figure 2C:
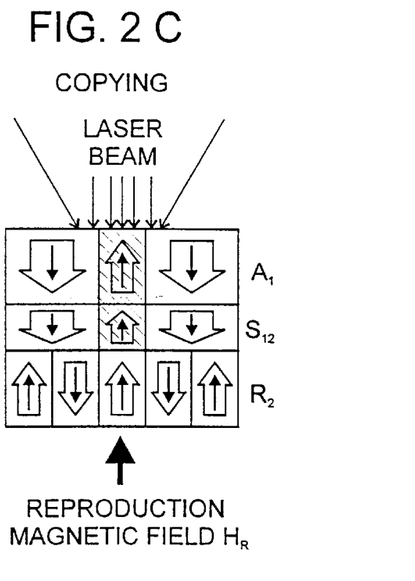

FIG. 2C: Copying of the magnetic domain

After the application of the initialization magnetic field, the medium is irradiated with a laser beam simultaneously with the application of the reproduction magnetic field $H_R$ as in the case of FIG. 1C.

Temperature of the magnetic layers is elevated by the irradiation of the laser beam, and the interface wall exchange coupling force between the recording layer $R_2$ and the switching layer $S_{12}$, and the interface wall exchange coupling force between the switching layer $S_{12}$ and the amplification layer $A_1$ are increased. The recorded magnetic domain of the recording layer $R_2$ is thereby copied to the switching layer $S_{12}$ and then to the amplification layer $A_1$ and to form copied magnetic domains in these magnetic layers. The magnetization direction of the copied magnetic domains formed in these magnetic layers is opposite to the direction of the initialization magnetization direction.

Figure 2D:
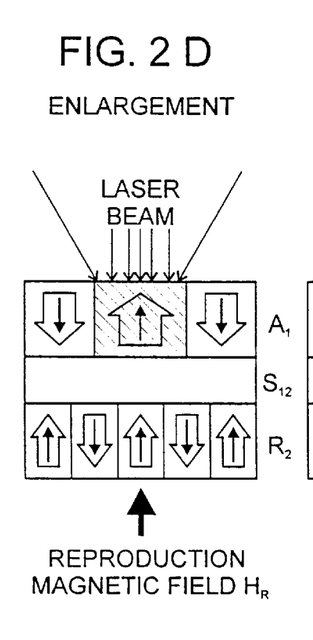

FIG. 2D: Enlargement of copied magnetic domain

The enlargement of the copied magnetic domain is accomplished as in the case of FIG. 1D in that the enlargement of the magnetic domain in the recording layer $R_2$ is avoided while the enlargement of the magnetic domain in the amplification layer $A_1$ is promoted.

The Curie temperature of the switching layer $S_{12}$ is preferably higher than the temperature at which the magnetic domain is copied, and lower than the temperature at which the force of magnetic domain enlargement is generated in the amplification layer $A_1$. The magnetic domain is copied as the temperature elevates by the irradiation of the laser beam, and the copied magnetic domain in the amplification layer $A_1$ enlarges by the further elevation in the temperature. If the Curie temperature of the switching layer $S_{12}$ is selected such that the magnetization of the switching layer $S_{12}$ has already disappeared before the copying and enlargement of the magnetic domain, the amplification layer $A_1$ is not affected by the exchange coupling force between the amplification layer $A_1$ and the recording layer $R_2$, and the enlargement of the copied magnetic domain is facilitated.

After such enlargement of the copied domain in the amplification layer $A_1$, the enlarged copied domain is read out by utilizing magnetic Kerr effect.

Figure 2E:
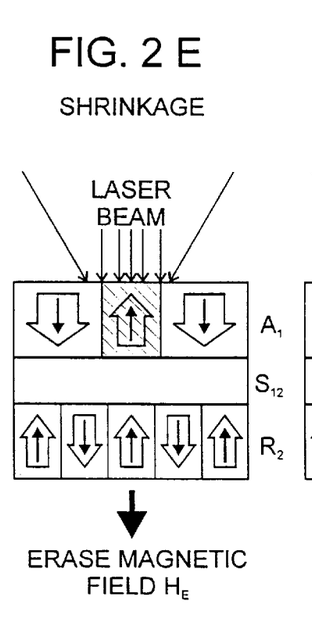
Figure 2F:
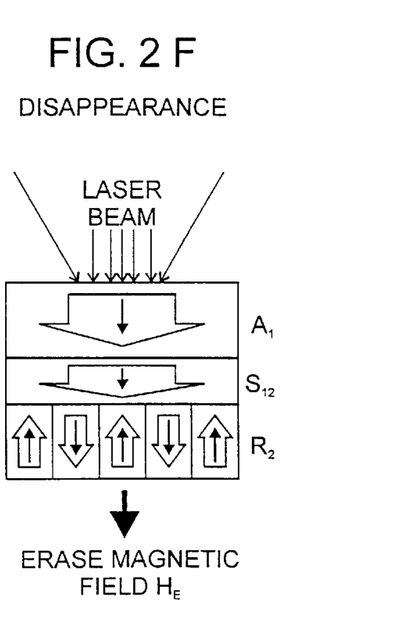

FIGS. 2E and 2F: Shrinkage and disappearance of copied magnetic domain

After reading out the copied magnetic domain in the amplification layer $A_1$ by utilizing magnetic Kerr effect, an erasing magnetic field $H_E$ is applied as in the case of the Constitution I. By the application of the erasing magnetic field $H_E$, the copied magnetic domain in the amplification layer $A_1$ shrinks by the Bloch wall exchange coupling force and disappears, and the magnetization direction of the region which had been the copied magnetic domain then restores its original magnetization direction the same as the direction of the surrounding region, namely, the magnetization direction of the initialization magnetic field $H_I$. As a consequence, the magnetization state of the magnetic layers returns to the state as shown the FIG. 2B.

The case of the magnetic domain whose magnetizing direction is opposite to the reproduction magnetic field Next, in the magnetic domains recorded in the recording layer $R_2$, reproduction of the magnetic domain having the magnetization direction opposite to the direction of the reproduction magnetic field, that is, reproduction of the magnetic domain having the magnetization direction shown by the arrow in the downward direction in FIGS. 2A, 2B, 2C, 2D, 2E and 2F is explained.

In this case, the magnetic domain of the recording layer $R_2$ is also copied to the switching layer $S_{12}$ and the amplification layer $A_1$. The magnetization direction of the copied magnetic domain formed, however, is the same as the initialization magnetic field, and the magnetization state of the amplification layer $A_1$ is not changed, and the same magnetization state is maintained throughout the process of the reproduction. In this state, the magnetization direction of the amplification layer $A_1$ is read out by the magnetic Kerr effect. In the reproduction process of this magnetic domain, it is necessary that the magnetization direction of the copied domain is not reversed throughout the process.

Reproduction Condition (Constitution II)

Copying Condition II

In order to enable sufficient copying of the magnetic domain from the recording layer $R_2$ to the switching layer $S_{12}$, the magnetic laminate should satisfy the relation:

$$Hw_{S12R2} + Hr > Hc_{S12} - Hd_{S12} \qquad \text{(II-1-1)}$$

when the amplification layer $A_1$ has a coercive force $Hc_{A1}$ and a demagnetizing field $Hd_{A1}$; the switching layer $S_{12}$ has a coercive force $Hc_{S12}$ and a demagnetizing field $Hd_{S12}$; the effective magnetic field caused by interface wall between the switching layer $S_{12}$ and the recording layer $R_2$ is $Hw_{S12R2}$; and the effective magnetic field caused by the interface wall between the amplification layer $A_1$ and the switching layer $S_{12}$ is $Hw_{A1S12}$; and the copying is accomplished by the reproduction magnetic field at an intensity of Hr. In order to enable sufficient copying of the magnetic domain from the switching layer $S_{12}$ to the amplification layer $A_1$, the magnetic laminate should satisfy the relation:

$$Hw_{A1S12} + Hr > Hc_{A1} - Hd_{A1} \tag{II-1-2}$$

It should be noted that the conditions represented by the relations (II-1-1) and (II-1-2) should be likewise satisfied whether the magnetization direction is the same as or opposite to the reproducing magnetic field.

Non-Reversal Condition II

When the magnetization direction of the copied magnetic domain is opposite to the reproducing magnetic field, it is necessary that the magnetization direction of the copied magnetic domain is not reversed by the application of the reproducing magnetic field. When the reproducing magnetic field has an intensity of Hr, such condition (non-reversal condition) for the switching layer $S_{12}$ may be represented by the relation:

$$Hr < Hw_{S12R2} + Hc_{S12} - Hd_{S12}, \text{ and} \tag{II-2-1}$$

such condition (non-reversal condition) for the amplification layer $A_1$ may be represented by the relation:

$$Hr < Hw_{A1S12} + Hc_{A1} - Hd_{A1}. \tag{II-2-2}$$

It should be noted that, since the temperature of the magnetic layers is higher than the Curie temperature of the switching layer $S_{12}$ during the enlargement of the copied magnetic domain, $Hw_{S12R2}$ and $Hw_{A1S12}$ are zero, the relation (II-2-2) is such that:

$$Hr < Hc_{A1} - Hd_{A1}. \tag{II-2-2'}$$

Enlargement Condition II

When the magnetization direction of the copied magnetic domain is the same as the reproducing magnetic field, the copied magnetic domain of the amplification layer $A_1$ should be enlarged by applying the reproducing magnetic field. When the effective magnetic field caused by the Bloch wall on the amplification $A_1$ is $Hw_{A1}$, the condition (enlargement condition) for enabling the enlargement of the copied magnetic domain in the amplification layer $A_1$ may be represented by the relation:

$$Hr > Hw_{A1} - Hd_{A1} \tag{II-3}$$

Disappearance Condition II

The copied magnetic domain in the amplification layer $A_1$ should disappear before the reproduction of the adjacent magnetic domain in the in-plane direction. When the magnetization direction of the copied magnetic domain in the amplification layer $A_1$ is the same as the reproducing magnetic field, the condition (disappearance condition) for enabling the disappearance of the copied magnetic domain of the amplification layer $A_1$ in the presence of the erasing magnetic field $H_E$ may be represented by the relation:

$$He > Hw_{A1S12} - Hw_{A1} - Hd_{A1} \tag{II-4}$$

Non-Copying Condition II

The condition (non-copying condition) required to prevent the re-copying of the magnetic domain of the recording layer $R_2$ to the switching layer $S_{12}$ when the temperature of the switching layer $S_{12}$ has reduced to a temperature below the Curie temperature may be represented by the relation:

$$Hw_{S12R2} < Hc_{S12} - Hd_{S12} + He \tag{II-5}$$

Condition of Amplification Layer $A_1$

In order to realize the enlargement condition and the non-reversal condition as described above at the same temperature in the amplification layer $A_1$, it is necessary to simultaneously satisfy the following relations:

$$Hr < Hc_{A1} - Hd_{A1}, \text{ and} \tag{II-2-2'}$$

$$Hr > Hw_{A1} - Hd_{A1}. \tag{II-3}$$

In other words, the relation:

$$Hc_{A1} > Hw_{A1} \tag{II-6}$$

should be met at the temperature at which the enlargement of the copied magnetic domain occurs in the amplification layer $A_1$.

Constitution III

The magneto-optical recording medium of constitution III has a constitution similar to the constitution I except that it has no exchange coupling control layer $C_{12}$. In other words, the amplification layer $A_1$ in constitution III is of a composition which does not have a compensation temperature higher than the room temperature.

Even if no exchange coupling control layer $C_{12}$ were provided, enlargement of the copied magnetic domain in the amplification layer $A_1$ can be facilitated as long as the exchange coupling between the amplification layer $A_1$ and the recording layer $R_2$ increases and decreases in the course of the copying and enlargement of the magnetic domain.

Constitution of the Magnetic Layers

Next the constitution of the magnetic layers is described in detail. The composition, thickness and the like of the magnet layers are not limited, and they may be selected to satisfy the relations as described above. The magnetic layers, however, may preferably be constituted as described below.

Amplification Layer $A_1$

The amplification layer contains a rare earth metal element and a transition metal element as its main components. The rare earth metal element used may preferably comprise at least Gd and/or Dy, and the transition metal element used may preferably comprise at least Fe and/or Co. The thickness is preferably in the range of from 10 to 100 nm. When the amplification layer is too thin, information stored in other magnetic layer is also read out through the amplification layer to result in the reduced C/N. When the amplification layer is too thick, the effective magnetic field caused by the interface wall can not be increased for the amplification layer, resulting in the insufficient copying of the magnetic domain. The Curie temperature is preferably in the range of 80 to 300° C.

Recording Layer $R_2$

The recording layer contains a rare earth metal element and a transition metal element as its main components. The rare earth metal element used may preferably comprise at least Tb, and the transition metal element used may preferably comprise at least Fe and Co. The thickness is preferably at least 10 nm. When the recording layer is too thin, the recorded magnetic domain is unstable and recording is substantially impossible. No particular upper limit is present for the thickness of the recording layer, and a thickness in excess of 100 nm will only invite cost increase. The Curie temperature is preferably in the range of 80 to 400° C.

Exchange Coupling Control Layer $C_{12}$

The exchange coupling control layer contains a rare earth metal element and a transition metal element as its main components. The rare earth metal element used may preferably comprise at least Gd and/or Dy, and the transition metal element used may preferably comprise at least Fe and/or Co. The thickness is preferably in the range of from 5 to 50 nm. When the exchange coupling control layer is too thin, the control of the exchange coupling as described above will be insufficient. When the exchange coupling control layer is too thick, the exchange coupling control layer $C_{12}$ as a whole can not play the role of the domain wall, and the control of the exchange coupling as described above is not realized. The Curie temperature is preferably at least 80° C.

Switching Layer $S_{12}$

The switching layer contains a rare earth metal element and a transition metal element as its main components. The rare earth metal element used may preferably comprise at least Gd and/or Dy, and the transition metal element used may preferably comprise at least Fe and/or Co. The thickness is preferably in the range of from 5 to 50 nm. When the switching layer is too thin, blockage of the exchange coupling will be difficult. When the switching layer is too thick, the effective magnetic field of the interface wall will be reduced and copy of the magnetic domain will be insufficient. The Curie temperature is preferably in the range of 80 to 300° C.

Enhancing Layer $E_{01}$

The enhancing layer is a magnetic layer of the magnetic laminate optionally provided on the side nearest to the substrate, namely, between the amplification layer $A_1$ and the substrate. The enhancing layer functions to enhance the Kerr effect. When the enhancing layer $E_{01}$ has a Curie temperature $Tc_{E01}$, and the amplification layer $A_1$ has a Curie temperature $Tc_{A1}$, the enhancement of the Kerr effect is attained when the relation is such that:

$Tc_{A1} < Tc_{E01}$

When this relation is not satisfied, Kerr effect is not enhanced. The Curie temperature is preferably at least 300° C.

The enhancing layer contains a rare earth metal element and a transition metal element as its main components. The rare earth metal element used may preferably comprise at least Gd, and the transition metal element used may preferably comprise at least Fe and Co. The thickness is preferably in the range of from 5 to 50 nm. When the enhancing layer is too thin, the enhancement effect will be reduced. When the enhancing layer is too thick, the properties of the amplification layer will be affected, and the reproduction along the scheme as described above will be difficult.

Dielectric Layer

In the magneto-optical recording medium of the constitution as described above, a first dielectric layer is generally formed between the substrate and the magnetic laminate, and a second dielectric layer is formed on the surface side of the magnetic laminate. Such dielectric layers protect the magnetic laminate, and also, enhances the Kerr effect and the Faraday effect. The dielectric layer may be fabricated from a metal oxide, a metal nitride, a metal sulfate, or a mixture of such metal compounds as in the case of the conventional magneto-optical medium. The first dielectric layer is generally deposited to a thickness of from about 30 to 300 nm, and the second dielectric layer is generally deposited to a thickness of from about 10 to 100 nm.

Reflective Layer

On the surface side of the second dielectric layer is optionally formed a reflective layer, which also functions as a heat release layer. The reflective layer is generally formed to a thickness of from 10 to 200 nm.

Protective Layer

A resin protective layer is formed to a thickness of from about 1 to 100 $\mu$m, generally as a top layer of the medium.

Substrate

In the magneto-optical recording medium used with the method of the present invention, the reproducing light is directed from the back side of the substrate, and the substrate should be substantially transparent to the reproducing light. The substrate, therefore, should be constituted from a material such as a resin or a glass.

EXAMPLES

Example 1 (Constitution I)

Magneto-optical recording disc sample I was prepared as described below by using a polycarbonate disc having an outer diameter of 120 mm and a thickness of 1.2 mm (track pitch 1.1 $\mu$m).

First dielectric layer

A first dielectric layer was formed by depositing a silicon nitride film by sputtering of a silicon target in $Ar+N_2$ atmosphere. The thickness was 60 nm.

Magnetic layers constituting the magnetic laminate

The layers were formed by sputtering in Ar atmosphere.

Second dielectric layer

A second dielectric layer was formed as in the case of the first dielectric layer. The thickness was 40 nm.

Protective layer

Resin protective layer was formed by spin coating a UV curable resin and curing the coated resin by UV irradiation. The thickness was about 5 $\mu$m.

The composition, thickness and Curie temperature (Tc) of the magnetic layers constituting the magnetic laminate are shown in Table 1. The composition of the magnetic layers was determined by using Auger spectrometer after evaluating the properties as described below. The thickness of the magnetic layers was calculated from sputter rate and sputtering time. The sputter rate was calculated by conducting the sputtering under the conditions the same as those used in practice for a prolonged period to form a thick film, measuring the thickness of the thus formed film, and dividing the measured film thickness by the sputtering time. Curie temperature of the magnetic layers was determined by preparing a sample comprising a glass substrate having deposited thereon a mono-layer film of the particular magnetic layer sandwiched by dielectric layers, and measuring the hysterisis loop for the thus prepared sample in the temperature range from the room temperature to the temperature at which the Curie temperature was confirmed.

TABLE 1

| Magnetic layer | Composition | Thickness (nm) | Tc (° C.) |
|---|---|---|---|
| Amplification layer $A_1$ | $Gd_{24}Fe_{76}$ | 30 | 220 |
| Exchange coupling control layer $C_{12}$ | $Gd_{37}Fe_{47}Co_{16}$ | 25 | 300 |
| Recording layer $R_2$ | $Tb_{22}Fe_{60}Co_{18}$ | 40 | 280 |

Evaluation of Properties

The thus prepared sample was recorded and reproduced in an optical disc evaluator under the conditions as described below.

Recording conditions
Wavelength of laser: 680 nm
Numerical aperture, NA: 0.55
Recording power: 8 mW
Recording magnetic field: 300 Oe
Relative linear velocity: 8 m/s
Light intensity modulated recording: frequency, 8 MHz
Reproducing conditions
Wavelength of laser: 680 nm
Numerical aperture, NA: 0.55
Reproducing power: 2.5 mW
Initialization magnetic field: 2000 Oe
Reproduction magnetic field: 500 Oe
Erasing magnetic field: 500 Oe
Relative linear velocity: 8 m/s
Magnetic field modulated reproducing: frequency, 16 MHz As a result of the recording and reproduction under the above-specified conditions, C/N was 44 dB.

Example 2 (Constitution II)

Magneto-optical recording disc sample II-1 was prepared as the same as the procedure of Example 1 except that the constitution of the magnetic laminate was as shown in Table 2.

TABLE 2

| Magnetic layer | Composition | Thickness (nm) | Tc (° C.) |
|---|---|---|---|
| Amplification layer $A_1$ | $Gd_{24}Fe_{76}$ | 30 | 220 |
| Switching layer $S_{12}$ | $Gd_{18}Dy_{21}Fe_{61}$ | 20 | 140 |
| Recording layer $R_2$ | $Tb_{22}Fe_{60}Co_{18}$ | 40 | 280 |

C/N of this sample was measured as the same as the procedure of Example 1 except that the reproducing magnetic field and the erasing magnetic field were 300 Oe. The C/N was 46 dB.

Example 3 (Constitution II)

Magneto-optical recording disc sample II-2 was prepared as the same as the procedure of Example 1 except that the constitution of the magnetic laminate was as shown in Table 3.

TABLE 6

| Magnetic layer | Composition | Thickness (nm) | Tc (° C.) |
|---|---|---|---|
| Enhancing layer $E_{01}$ | $Gd_{25}Fe_{53}Co_{22}$ | 14 | 320 |
| Amplification layer $A_1$ | $Gd_{24}Fe_{76}$ | 18 | 220 |
| Switching layer $S_{12}$ | $Gd_{18}Dy_{21}Fe_{61}$ | 20 | 140 |
| Recording layer $R_2$ | $Tb_{22}Fe_{60}Co_{18}$ | 40 | 280 |

C/N of this sample was 48 dB when it was measured by repeating the procedure of Example 2.

Example 4 (Constitution III)

Magneto-optical recording disc sample III was prepared as the same as the procedure of Example 1 except that the constitution of the magnetic laminate was as shown in Table 4.

TABLE 4

| Magnetic layer | Composition | Thickness (nm) | Tc (° C.) |
|---|---|---|---|
| Amplification layer $A_1$ | $Gd_{24}Fe_{76}$ | 30 | 220 |
| Recording layer $R_2$ | $Tb_{22}Fe_{60}Co_{18}$ | 40 | 280 |

C/N of this sample was 41 dB when it was measured as the same as the procedure of Example 1.

What is claimed is:

1. A magneto-optical recording medium having a magnetic laminate on the surface side of the substrate, said magnetic laminate comprising a triple-layer magnetic laminate comprising an amplification layer $A_1$, an exchange coupling control layer $C_{12}$ and a recording layer $R_2$ formed in that order, wherein:

in a recording operation, a recorded magnetic domain is formed in the recording layer $R_2$ by irradiation of a laser beam and application of a recording magnetic field; and in a reproduction operation, the magnetic domain in the recording layer $R_2$ is copied to the amplification layer $A_1$ to form a copied magnetic domain simultaneously with the enlarging of the thus formed copied magnetic domain and application of a reproduction magnetic field;

the amplification layer $A_1$ has a compensation temperature lower than room temperature; and the Curie temperature $TC_{A1}$ of the amplification layer $A_1$ and the Curie temperature $TC_{C12}$ of the exchange coupling control layer $C_{12}$ are in the relation:

$$TC_{A11} < TC_{R2}.$$

2. A magneto-optical recording medium according to claim 1 wherein the Curie temperature $Tc_{A1}$ of the amplification layer $A_1$ and the Curie temperature $Tc_{R2}$ of the recording layer $R_2$ are in the relation:

$$Tc_{A1} < Tc_{R2}.$$

3. A magneto-optical recording medium according to claim 1 wherein the magnetic laminate further comprises an enhancing layer $E_{01}$ formed between the amplification layer $A_1$ and the substrate, said enhancing layer $E_{01}$ being a magnetic layer for the purpose of enhancing Kerr effect; and the Curie temperature $Tc_{E01}$ of the enhancing layer $E_{01}$ and the Curie temperature of $Tc_{A1}$ of the amplification layer $A_1$ are in the relation:

$$Tc_{A1} < Tc_{E01}.$$

4. A magneto-optical recording medium having a magnetic laminate on the surface side of the substrate, said magnetic laminate comprising a triple-layer magnetic laminate comprising an amplification layer $A_1$, a switching layer $S_{12}$ and a recording layer $R_2$ formed in that order, wherein:

in a recording operation, a recorded magnetic domain is formed in the recording layer $R_2$ by irradiation of a laser beam and application of a recording magnetic field; and in a reproduction operation, the magnetic domain in the recording layer $R_2$ is copied to the amplification layer $A_1$ to form a copied magnetic domain simultaneously with the enlarging of the thus formed copied magnetic domain and application of a reproduction magnetic field;

the amplification layer $A_1$ has a compensation temperature lower than room temperature; and the Curie temperature $TC_{S12}$ of the switching layer $S_{12}$ and the Curie temperature $TC_{A1}$ of the amplification layer $A_1$ are such that $TC_{S12}$ is higher than room temperature and $TC_{S12}$ and $TC_{A1}$ are in the relation:

$$TC_{S12} < TC_{A1}.$$

5. A magneto-optical recording medium according to claim 4 wherein the Curie temperature $Tc_{A1}$ of the amplification layer $A_1$ and the Curie temperature $Tc_{R2}$ of the recording layer $R_2$ are in the relation:

$$Tc_{A1} < Tc_{R2}.$$

6. A magneto-optical recording medium according to claim 4 wherein the magnetic laminate further comprises an enhancing layer $E_{01}$ formed between the amplification layer $A_1$ and the substrate, said enhancing layer $E_{01}$ being a magnetic layer for the purpose of enhancing Kerr effect; and the Curie temperature $Tc_{E01}$ of the enhancing layer $E_{01}$ and the Curie temperature of $Tc_{A1}$ of the amplification layer $A_1$ are in the relation:

$$Tc_{A1} < Tc_{E01}.$$

7. A magneto-optical recording medium having a magnetic laminate on the surface side of the substrate, said magnetic laminate comprising a double-layer magnetic laminate comprising an amplification layer $A_1$ and a recording layer $R_2$ formed in that order, wherein:

in a recording operation, a recorded magnetic domain is formed in the recording layer $R_2$ by irradiation of a laser beam and application of a recording magnetic field; and in a reproduction operation, the magnetic domain in the recording layer $R_2$ is copied to the amplification layer $A_1$ to form a copied magnetic domain simultaneously with the enlarging of the thus formed copied magnetic domain in the amplification layer $A_1$ by irradiation of a laser beam and application of a reproduction magnetic field;

the amplification layer $A_1$ has a compensation temperature lower than room temperature.

8. A magneto-optical recording medium according to claim 7 wherein the Curie temperature $Tc_{A1}$ of the amplification layer $A_1$ and the Curie temperature $Tc_{R2}$ of the recording layer $R_2$ are in the relation:

$$Tc_{A1} < Tc_{R2}.$$

9. A magneto-optical recording medium according to claim 7 wherein the magnetic laminate further comprises an enhancing layer $E_{01}$ formed between the amplification layer $A_1$ and the substrate, said enhancing layer $E_{01}$ being a magnetic layer for the purpose of enhancing Kerr effect; and the Curie temperature $Tc_{E01}$ of the enhancing layer $E_{01}$ and the Curie temperature of $Tc_{A1}$ of the amplification layer $A_1$ are in the relation:

$$Tc_{A1} < Tc_{E01}.$$

10. A magneto-optical recording medium having a magnetic laminate on the surface side of the substrate, said magnetic laminate comprising a triple-layer magnetic laminate comprising an amplification layer $A_1$, an exchange coupling control layer $C_{12}$ and a recording layer $R_2$ formed in that order, wherein:

in a recording operation, a recorded magnetic domain is formed in the recording layer $R_2$ by irradiation of a laser beam and application of a recording magnetic field; and in a reproduction operation, the magnetic domain in the recording layer $R_2$ is copied to the amplification layer $A_1$ to form a copied magnetic domain simultaneously with the enlarging of the thus formed copied magnetic domain and application of a reproduction magnetic field;

the amplification layer $A_1$ is not compensated by temperature; and the Curie temperature $TC_{A1}$ of the amplification layer $A_1$ and the Curie temperature $TC_{C12}$ of the exchange coupling control layer $C_{12}$ are in the relation:

$$TC_{A1} < TC_{C12}.$$

11. A magneto-optical recording medium according to claim 10, wherein the Curie temperature $TCA1$ of the amplification layer $A_1$ and the Curie temperature $TC_{R2}$ of the recording layer $R_2$ are in the relation:

$$TC_{A1} < TC_{R2}.$$

12. A magneto-optical recording medium according to claim 10, wherein the magnetic laminate further comprises an enhancing layer $E_{01}$ formed between the amplification layer $A_1$ and the substrate, said enhancing layer $E_{01}$ being a magnetic layer for the purpose of enhancing the Kerr effect; and the Curie temperature $TCE_{01}$ of the enhancing layer $E_{01}$ and the Curie temperature of $TC_{A1}$ of the amplification layer $A_1$ are in the relation:

$$TC_{A1} < TC_{E01}.$$

13. A magneto-optical recording medium having a magnetic laminate on the surface side of the substrate, said magnetic laminate comprising a triple-layer magnetic laminate comprising an amplification layer $A_1$, a switching layer $S_{12}$ and a recording layer $R_2$ formed in that order, wherein:

in a recording operation, a recorded magnetic domain is formed in the recording layer $R_2$ by irradiation of a laser beam and application of a recording magnetic field; and in a reproduction operation, the magnetic domain in the recording layer $R_2$ is copied to the amplification layer $A_1$ to form a copied magnetic domain simultaneously with the enlarging of the thus formed copied magnetic domain and application of a reproduction magnetic field;

the amplification layer $A_1$ is not compensated by temperature; and the Curie temperature $TC_{S12}$ of the switching layer $S_{12}$ and the Curie temperature $TC_{A1}$ of the amplification layer $A_1$ are such that $TC_{S12}$ is higher than room temperature and $TC_{S12}$ and $TC_{A1}$ are in the relation:

$$TC_{S12}<TC_{A1}.$$

14. A magneto-optical recording medium according to claim 13, wherein the Curie temperature $TCA1$ of the amplification layer $A_1$ and the Curie temperature $TC_{R2}$ of the recording layer $R_2$ are in the relation:

$$TC_{A1}<TC_{R2}.$$

15. A magneto-optical recording medium according to claim 13, wherein the magnetic laminate further comprises an enhancing layer E formed between the amplification layer A1 and the substrate, said enhancing layer $E_{01}$ being a magnetic layer for the purpose of enhancing the Kerr effect; and the Curie temperature $TCE_{01}$ of the enhancing layer $E_{01}$ and the Curie temperature of $TC_{A1}$ of the amplification layer $A_1$ are in the relation:

$$TC_{A1}<TC_{E01}.$$

16. A magneto-optical recording medium having a magnetic laminate on the surface side of the substrate, said magnetic laminate comprising a double-layer magnetic laminate comprising an amplification layer $A_1$ and a recording layer $R_2$ formed in that order, wherein:

in a recording operation, a recorded magnetic domain is formed in the recording layer $R_2$ by irradiation of a laser beam and application of a recording magnetic field; and in a reproduction operation, the magnetic domain in the recording layer $R_2$ is copied to the amplification layer $A_1$ to form a copied magnetic domain simultaneously with the enlarging of the thus formed copied magnetic domain and application of a reproduction magnetic field;

the amplification layer $A_1$ is not compensated by temperature.

17. A magneto-optical recording medium according to claim 16, wherein the Curie temperature $TC_{A1}$ of the amplification layer $A_1$ and the Curie temperature $TC_{R2}$ of the recording layer $R_2$ are in the relation:

$$TC_{A1}<TC_{R2}.$$

18. A magneto-optical recording medium according to claim 16, wherein the magnetic laminate further comprises an enhancing layer $E_{01}$ formed between the amplification layer $A_1$ and the substrate, said enhancing layer $E_{01}$ being a magnetic layer for the purpose of enhancing the Kerr effect; and the Curie temperature $TCE_{01}$ of the enhancing layer $E_{01}$ and the Curie temperature of $TC_{A1}$ of the amplification layer $A_1$ are in the relation:

$$TC_{A1}<TC_{E01}.$$

* * * * *

UNITED STATES PATENT AND TRADEMARK OFFICE
CERTIFICATE OF CORRECTION

PATENT NO.  : 6,120,921
DATED       : September 19, 2000
INVENTOR(S) : Jiro Yoshinari et al.

It is certified that error appears in the above-identified patent and that said Letters Patent is hereby corrected as shown below:

Column 16,
Line 51, delete "$^{TC}_{A1}$" and insert -- $Tc_{A1}$ --
Line 52, delete "$TC_{c12}$" and insert -- $Tc_{c12}$ --
Line 56, delete "$TC_{A11} < TC_{R2}$" and insert -- $TcA11 < Tc_{R2}$ --

Column 17,
Line 27, delete "$TC_{s12}$" and insert -- $Tc_{s12}$ --
Line 28, delete "$TC_{A1}$" and insert -- $Tc_{A1}$ --
Line 29, delete "$TC_{s12}$" and insert -- $Tc_{s12}$ --
Line 30, delete "$TC_{s12}$" and "$TC_{A1}$" and insert -- $Tc_{s12}$ -- and -- $Tc_{A1}$ --, respectively
Line 31, delete "$TC_{s12} < TC_{A1}$" and insert -- $Tc_{s12} < Tc_{A1}$ --

Column 18,
Line 41, delete "$TC_{A1}$" and insert -- $Tc_{A1}$ --
Line 42, delete "$TC_{C12}$" and insert -- $Tc_{c12}$ --
Line 45, delete "$TC_{A1} < TC_{c12}$" and insert -- $Tc_{A1} < Tc_{c12}$ --
Line 47, delete "TCA1" and insert -- $Tc_{A1}$ --
Line 49, delete "$TC_{R2}$" and insert -- $Tc_{R2}$ --
Line 54, delete "$TC_{A1} < TC_{R2}$" and insert -- $Tc_{A1} < Tc_{R2}$ --
Line 59, delete "$TCE_{01}$" and insert -- $Tc_{E01}$ --
Line 61, delete "$TC_{A1}$" and insert -- $Tc_{A1}$ --
Line 65, delete "$TC_{A1} < TC_{E01}$" and insert -- $Tc_{A1} < Tc_{E01}$ --

Column 19,
Line 18, delete "$TC_{s12}$" and insert -- $Tc_{s12}$ --
Line 19, delete "$TC_{A1}$" and insert -- $Tc_{A1}$ --
Line 20, delete "$TC_{s12}$" and insert -- $Tc_{s12}$ --
Line 21, delete "$TC_{s12}$" and "$TC_{A1}$" and insert -- $Tc_{s12}$ -- and -- $Tc_{A1}$--, respectively
Line 25, delete "$TC_{s12} < TC_{A1}$" and insert -- $Tcs12 < Tc_{A1}$ --
Line 27, delete "TCA1" and insert -- $Tc_{A1}$ --
Line 28, delete "$TC_{R2}$" and insert $Tc_{R2}$ --

UNITED STATES PATENT AND TRADEMARK OFFICE
CERTIFICATE OF CORRECTION

PATENT NO. : 6,120,921
DATED : September 19, 2000
INVENTOR(S) : Jiro Yoshinari et al.

It is certified that error appears in the above-identified patent and that said Letters Patent is hereby corrected as shown below:

Line 31, delete "$TC_{A1} < TC_{R2}$" and insert -- $Tc_{A1} < Tc_{R2}$ --
Line 40, delete "$TCE_{01}$" and insert -- $Tc_{E01}$ --

Column 20,
Line 1, delete "$TC_{A1}$" and insert -- $Tc_{A1}$ --
Line 3, delete "$TC_{A1} < TC_{E01}$" and insert -- $Tc_{A1} < Tc_{E01}$ --
Line 24, delete "$TC_{A1}$" and insert -- $Tc_{A1}$ --
Line 25, delete "$TC_{A1}$" and insert -- $Tc_{A1}$ --
Line 27, delete "$TC_{A1} < TC_{R2}$" and insert -- $Tc_{A1} < Tc_{R2}$ --
Line 34, delete "$TCE_{01}$" and insert -- $TC_{E01}$ --
Line 35, delete "$TC_{A1}$" and insert -- $Tc_{A1}$ --
Line 38, delete "$TC_{A1} < TC_{E01}$" and insert -- $Tc_{A1} < Tc_{E01}$ --

Signed and Sealed this

Twenty-second Day of January, 2002

Attest:

Attesting Officer

JAMES E. ROGAN
*Director of the United States Patent and Trademark Office*